US006212878B1

(12) United States Patent
Adzhian et al.

(10) Patent No.: US 6,212,878 B1
(45) Date of Patent: Apr. 10, 2001

(54) GAS GENERATOR MODULE

(75) Inventors: Alexei Pogosovich Adzhian, Moscow; Vladimir Jurievich Bogushev, Khimki; Alexandr Mikhailovich Samsonov, Moscow; Jury Anatolievich Tjurin, Khimki, all of (RU)

(73) Assignee: Otkrytoe Aktsionernoe Obschestvo "Nauchno-Proizvodstvennoe Obiedinenie "Energomash" Imeni Akademika V.P. Glushko", Moscow (RU)

( * ) Notice: Subject to any disclaimer, the term of this patent is extended or adjusted under 35 U.S.C. 154(b) by 0 days.

(21) Appl. No.: 09/410,872

(22) Filed: Oct. 1, 1999

(30) Foreign Application Priority Data

Mar. 1, 1999 (RU) .................................. 99103734

(51) Int. Cl.$^7$ ........................................... F02K 9/52
(52) U.S. Cl. .................. 60/258; 239/424.5; 239/427.5
(58) Field of Search .............................. 60/258, 259, 740, 60/732; 239/424.5, 427.3, 427.5

(56) References Cited

U.S. PATENT DOCUMENTS

| 3,851,468 | * | 12/1974 | Frankie et al. ........................ 60/258 |
| 4,845,940 | * | 7/1989 | Beer ........................................ 60/732 |
| 4,974,415 | | 12/1990 | Shekleton et al. . |
| 5,112,219 | * | 5/1992 | Hiemstra ............................ 239/424.5 |
| 5,172,548 | * | 12/1992 | Dubedout et al. .................... 60/258 |
| 5,456,065 | * | 10/1995 | Dargies ................................ 60/258 |
| 5,704,551 | * | 1/1998 | Schmidt et al. ...................... 60/258 |
| 5,882,184 | * | 3/1999 | Feldermann ...................... 239/424.5 |
| 5,927,960 | * | 7/1999 | Felderman ........................ 431/158 |

FOREIGN PATENT DOCUMENTS

| 4305154 | 5/1994 | (DE) . |
| 2041375 | 8/1995 | (RU) . |

* cited by examiner

Primary Examiner—Ted Kim
(74) Attorney, Agent, or Firm—Blakely Sokoloff Taylor & Zafman

(57) ABSTRACT

The invention relates to the field of power machine building and may be used in mixing devices of gas generators for driving gas turbines, in particular, for liquid-propellant rocket engines.

A gas generator comprises a cover with a hole, a bottom with a mixing chamber, a housing with an axial duct communicating with the hole in the cover. The housing is fastened in the cover hole and/or in the mixing chamber of the bottom. Grooves are made uniformly along the circumference of the cross section of the housing in the bottom and/or on the housing. The hole in the cover and the axial duct are designed to supply propellant, and the space between the cover and the bottom and the grooves in the bottom and/or on the housing are designed to supply an oxidizer. A propellant space is made in the cover, and the axial duct communicates through the propellant space with the hole in the cover by means of tangential propellant supply holes. An annular oxidizer duct and a cylindrical mixing chamber are additionally made in the module housing. The annular oxidizer duct is placed concentrically to the axial duct and communicates coaxially with the cylindrical mixing chamber, and by tangential oxidizer supply holes communicates with the space between the cover and the bottom.

4 Claims, 2 Drawing Sheets

# GAS GENERATOR MODULE

FIELD OF THE INVENTION

The invention relates to the field of power machine building and is concerned with the realization of mixing devices of gas generators for driving gas turbines, in particular for liquid-propellant rocket engines.

BACKGROUND OF THE INVENTION

A mixing device for a combustion chamber of a liquid-propellant rocket engine is known in which a mixer is made in the form of a centrifugal injector mounted inside a combustion chamber housing and coupled to propellant and oxidizer feed ducts (Russian patent No. 2041375, F02K 9/52, 1990).

The known mixing device cannot be used in high-thrust engines in view of the fact that making the mixer in the form of a centrifugal injector sharply increases the radial dimensions of the mixer, and thus worsens the weight-size characteristics of the engine as a whole.

A mixing device of a gas generator is known in which a mixer housing is mounted inside an oxidizer space formed by the bottom and another stationary part of the housing, an axial propellant feed duct being made in the mixer housing and an oxidizer feed duct being made annular and separated from the propellant feed duct by a cylindrical baffle (U.S. Pat. No. 4,974,415, NPC 60-733, 1988).

The main disadvantage of this known mixing device is the complexity of providing a table combustion process at low temperatures of the generator gas supplied to the turbine of a liquid-propellant rocket engine.

The most similar technical solution is a mixing module for liquid-propellant rocket engines, which comprises a cover and a bottom and is installed with the formation of a space between them for feeding one of the components to be mixed, and a module housing mounted in the space between the cover and the bottom and provided with an axial duct communicating with a duct for feeding another component and open towards a mixing chamber, the space between the cover and the bottom being coupled to the mixing chamber by means of longitudinal grooves uniformly located along the circumference of the cross section of the module housing (German patent No. 4305154, IPC F02K 9/52, 1993).

In this known mixing module, a propellant is fed into the mixing chamber from the space between the cover and the bottom, and the axial duct of the module housing is coupled to the oxidizer feed duct, wherewith it is not possible to provide an additional supply of oxidizer to the combustion products in order to reduce the temperature of the generator gas.

SUMMARY OF THE INVENTION

The object of the invention is to increase the operating efficiency of a mixing module.

The technical result that may be obtained by using the present invention consists of improving the quality of mixing while producing gas with a high content of oxygen and with a reduced temperature.

This result is achieved in a gas generator module comprising a cover, a bottom and a housing installed therebetween, a mixing chamber made in the bottom in the place of installation of the housing, main propellant and oxidizer feed lines, the housing having an axial duct, and longitudinal grooves uniformly arranged along the circumference of the housing from the side of the bottom to communicate the mixing chamber with the space between the cover and the bottom, in that in accordance with the invention the axial duct of the housing from the side of the cover is made closed and has tangential holes for feeding propellant which are uniformly positioned on a surface of the housing and communicate with the main propellant feed line, the space between the bottom and the cover communicates with the main oxidizer feed line, wherein an additional annular duct, positioned coaxially to the axial duct and having tangential holes for feeding the oxidizer, which open into the space between the bottom and the cover, and an additional mixing chamber formed by extension of an external wall of the annular duct and communicating at one side with the annular duct and the axial duct and at another side with the mixing chamber made in the bottom, are made in the housing.

Wherein, a tapered bore, the longitudinal axis of which coincides with the longitudinal axis of the bottom mixing chamber, is preferably made in the bottom at the side opposite to the module housing. Wherewith the additional cylindrical mixing chamber of the module housing is preferably made with a length equal to at least twice its diameter.

Also, the tangential holes of the annular duct are preferably made in the form of two rows of holes, uniformly positioned along the circumference of the housing.

DETAILED DESCRIPTION OF THE PREFERRED EMBODIMENT

Figure 1:
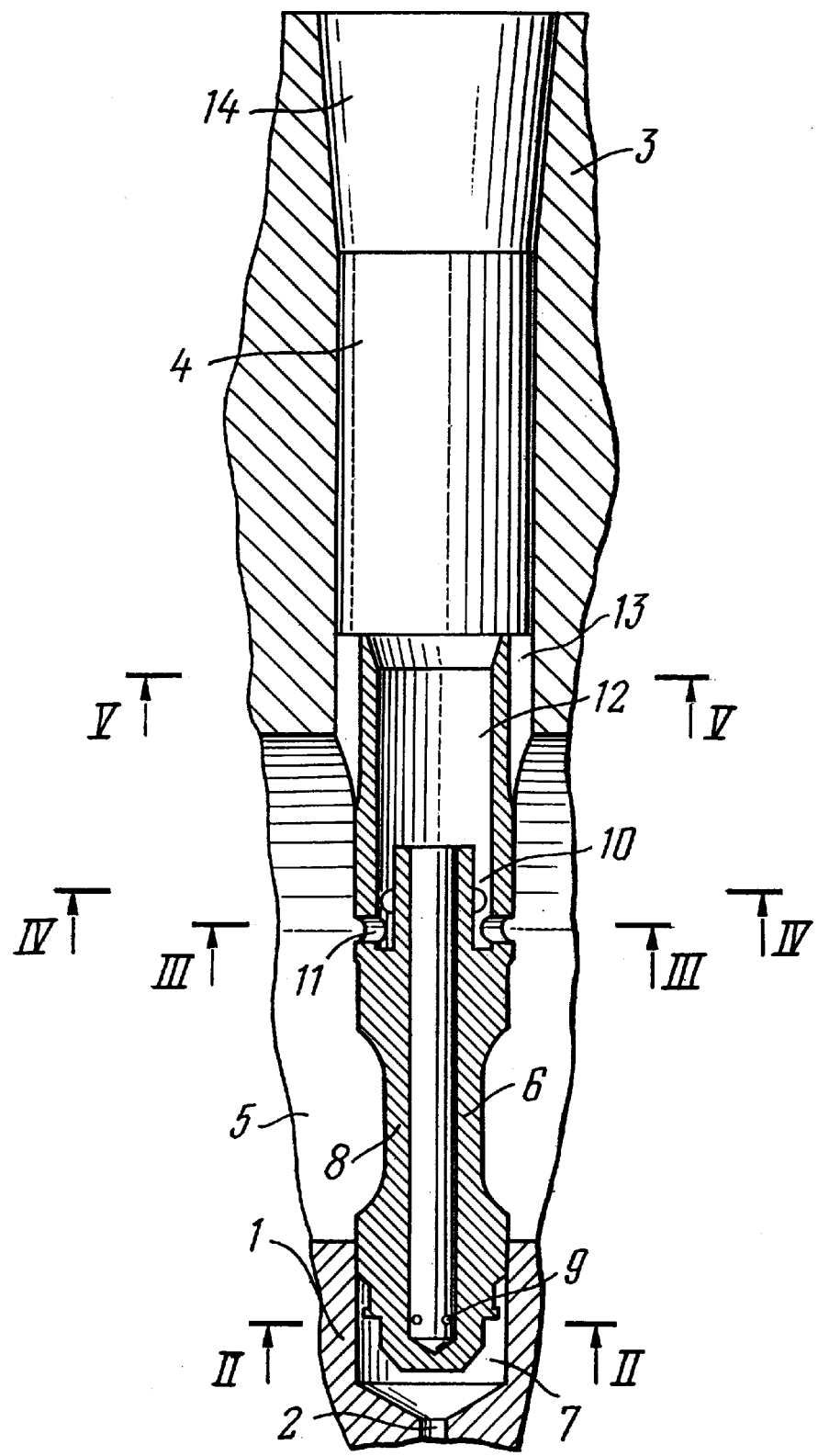
FIG. 1 shows a longitudinal cross-sectional general view of a gas generator module.

A gas generator module (FIG. 1) comprises a cover 1 with a duct 2 communicating with a main propellant feed line, a bottom 3 with a mixing chamber 4. The bottom 3 is rigidly fixed to the cover 1 with formation of a space 5 therebetween, the space 5 communicating with a main oxidizer feed line. A housing 6 is placed in the space 5 and mounted by one end in the mixing chamber 4 of the bottom 3 and by the other end in the hole 7 of the cover 1, the hole 7 communicating with the propellant feed duct 2. The housing 6 is rigidly connected by at least one of its ends to the cover 1 or the bottom 3.

Figure 5:
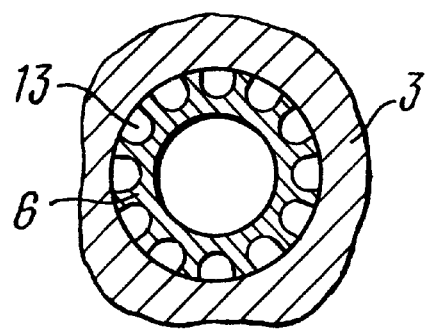
FIG. 5 shows a cross section A—A of the module housing.
Figure 2:
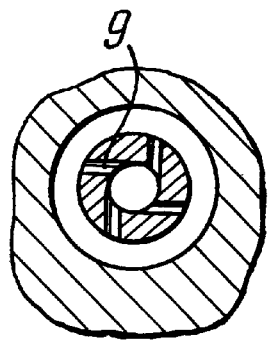
FIG. 2 shows a cross section B—B of the module housing.
Figure 3:
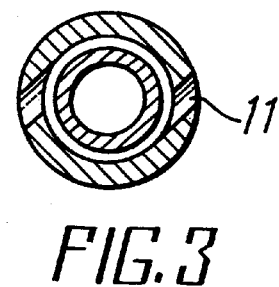
FIG. 3 shows a cross section C—C of the module housing.
Figure 4:
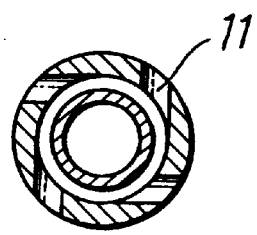
FIG. 4 shows a cross section D—D of the module housing.

An axial duct 8, communicating through the tangential holes 9 with the space of the hole 7 of the cover 1, which communicates with the main propellant feed line, and an annular duct 10, positioned concentrically to the axial duct 8 and communicating through tangential holes 11 (FIGS. 1, 3, 4) with the cavity 5 communicating with the main oxidizer feed line, are made in the housing 6. Furthermore, an additional mixing chamber 12, formed by an extension of an external wall of the annular duct 10, is made in the housing 6. The additional mixing chamber 12 communicates on one side with the annular duct 10, ensuring supply of the oxidizer, and with the axial duct 8, ensuring supply of the propellant, and on another side with the mixing chamber 4 made in the bottom 3. The space 5 communicating with the main oxidizer feed line is hydraulically connected to the mixing chamber 4 by the ducts 13 (FIGS. 1, 5), which may be made in the form of longitudinal grooves on one of the conjugated surfaces of the housing 6 or the mixing chamber 4, which are uniformly positioned along the circumference of the housing.

Figure 6:
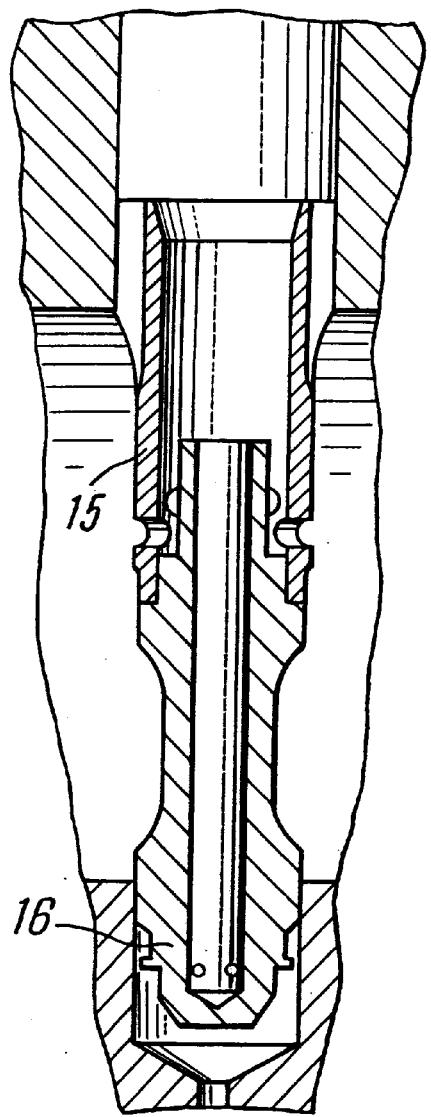
FIG. 6 shows the module housing made of two parts joined by welding.

The mixing chamber 4 (FIG. 1) may be made with a tapered bore 14 at the outlet of the chamber. The additional mixing chamber 12 has a length equal to at least twice its diameter. The tangential holes 11 coupled to the annular duct 10 may be made in the form of two rows of holes uniformly positioned along the circumference of the cross section of the housing 6. The housing 6 may be made of two parts 15 and 16 (FIG. 6) which are joined to each other by welding.

During operation of the gas generator module (FIG. 1), liquid oxygen is fed into the space 5 communicating with the main oxidizer feed line, and kerosene, fed into the additional mixing chamber 12, enters the axial duct 8 from the propellant feed duct 2 through the tangential holes 9. Liquid oxygen through the tangential holes 11 and the annular duct 10 is fed into the additional mixing chamber 12 and is mixed with kerosene for its combustion.

High-temperature combustion products enter the mixing chamber 4 of the bottom 3, where they are diluted and cooled by the liquid oxygen coming from the space 5 through the longitudinal grooves 13.

The proposed mixing module may be most successfully used in mixing devices of gas generators to drive gas turbines, in particular, for liquid-propellant rocket engines.

What is claimed is:

1. A gas generator module comprising a cover, a bottom and a housing installed therebetween, a mixing chamber made in the bottom in the place of installation of the housing, main propellant and oxidizer feed lines, the housing having an axial duct, and longitudinal grooves uniformly arranged along a circumference of the housing from the side of the bottom to communicate the mixing chamber with a space between the cover and the bottom, wherein the axial duct of the housing from the side of the cover is made closed and has tangential holes for feeding propellant, which are uniformly positioned on a surface of the housing and communicate with the main propellant feed line, the space between the bottom and the cover communicates with the main oxidizer feed line, wherein an additional annular duct, positioned coaxially to the axial duct and having tangential holes for feeding the oxidizer, which open into the space between the bottom and the cover, and an additional mixing chamber formed by extension of an external wall of the annular duct and communicating at one side with the annular duct and the axial duct and at another side with the mixing chamber made in the bottom, are made in the housing.

2. A gas generator module according to claim 1, wherein a tapered bore, a longitudinal axis of which coincides with a longitudinal axis of the bottom mixing chamber, is made in the bottom at the side opposite to the housing.

3. A gas generator module according to claim 1, wherein the additional cylindrical mixing chamber of the module housing is made with a length equal to at least twice its diameter.

4. A gas generator module according to claim 1, wherein the tangential holes of the annular duct are made in the form of two rows of holes, uniformly positioned along the circumference of the housing.

* * * * *